(No Model.)

L. LAVIGNE.
RUNNER ATTACHMENT FOR VEHICLES.

No. 543,387. Patented July 23, 1895.

Witnesses
Percy C. Bowen
John P. Wilson

Inventor
Louis Lavigne,
By Whitman & Wilkinson,
Attorneys.

UNITED STATES PATENT OFFICE.

LOUIS LAVIGNE, OF MARINETTE, WISCONSIN.

RUNNER ATTACHMENT FOR VEHICLES.

SPECIFICATION forming part of Letters Patent No. 543,387, dated July 23, 1895.

Application filed May 17, 1895. Serial No. 549,671. (No model.)

*To all whom it may concern:*

Be it known that I, LOUIS LAVIGNE, a citizen of the United States, residing at Marinette, in the county of Marinette and State of Wisconsin, have invented certain new and useful Improvements in Runner Attachments for Four-Wheel Vehicles; and I do hereby declare the following to be a full, clear, and exact description of the invention, such as will enable others skilled in the art to which it appertains to make and use the same.

My invention relates to improvements in runner attachments for baby-carriages; and it consists in certain novel features hereinafter described and claimed.

Reference is had to the accompanying drawings, in which the same parts are indicated by the same letters throughout the several views.

Figure 1:
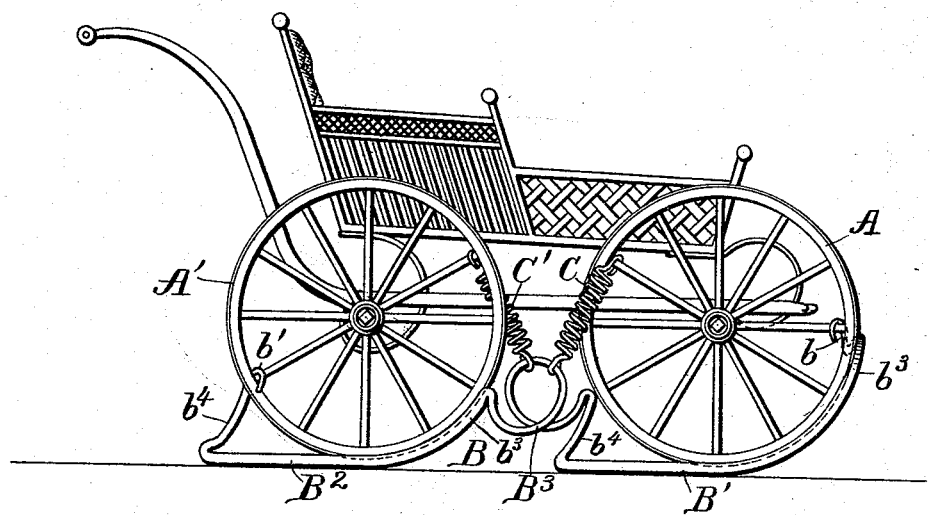
Figure 2:
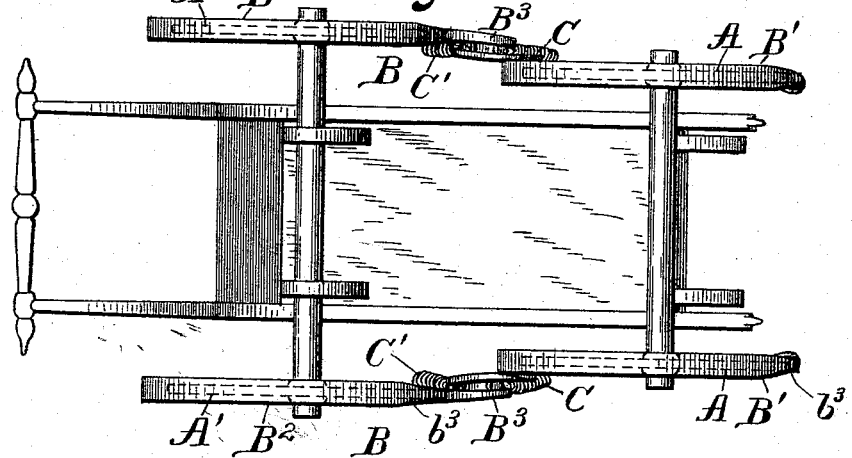
Figure 3:
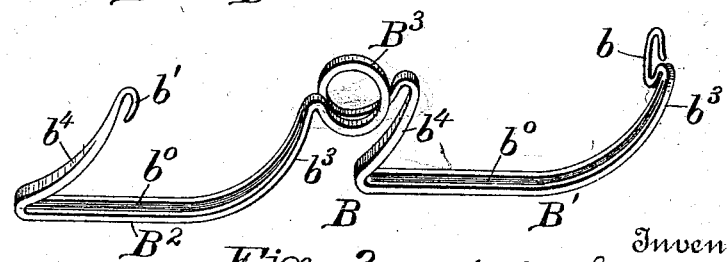

Figure 1 represents a side elevation of a baby-carriage provided with my improved runner attachment. Fig. 2 represents an inverted plan view of the device shown in Fig. 1, and Fig. 3 represents a perspective view of one of the runners as detached from the baby-carriage.

The wheels of a baby-carriage are represented by A and A', are generally of different gage, as shown in Fig. 2, and where one runner is put on both wheels there is a tendency of the vehicle to wedge into the snow and thus form a sort of snow-plow, while with the herein-described runner each wheel is provided with an independent runner which is parallel to the longitudinal axis of the vehicle. These runners, indicated by B, are preferably formed of two parts B' and B², joined together by a spring B³, the whole formed of one piece of wrought iron or steel worked into the desired shape. Each of these parts B' and B² is provided with a groove $b^0$ to receive the tire of the wheel, and an upwardly-projecting part $b^3$, adapted to be held close against the wheel, as shown most clearly in Fig. 1. The front end of the runner is attached to one spoke of the front wheel by a hook $b$, and the rear end of the runner is attached to one spoke of the rear wheel by a hook $b'$, which hooks may be made integral with the runner, as shown, or may be attached thereto in any convenient way. The rear end of the runner for each wheel is bent upward, as at $b^4$, while coil-springs C and C' connect the front and rear wheels with the central portion B³ of the runner, and thus not only serve to support the runner and hold it firmly against the wheels, but also to lock the wheels against rotation on their axles.

It will be obvious that the herein-described attachment may be readily applied to or detached from a baby-carriage, and thus the same may be readily converted from a wheeled vehicle to a sleigh, or vice versa, as may be desired.

While I have described my invention as applicable to baby-carriages, since this is the most common use contemplated for the same, it will also be evident that the same might be applied to larger vehicles of various kinds, with or without minor changes, such as would readily suggest themselves to any practical mind.

Having thus described my invention, what I claim, and desire to secure by Letters Patent of the United States, is—

1. A runner attachment for wheeled vehicles in which the wheels are of a different gage, which comprises a bar or plate formed near the two ends thereof into grooved runners for the two wheels on a side, with the central portion of said bar or plate formed into a coil spring, with means for attaching the front and rear ends of said bar to the wheels of the vehicle, and for attaching said coil spring to the opposite sides of the said wheels, substantially as and for the purposes described.

2. A runner attachment for wheeled vehicles, which comprises a bar or plate formed near the two ends thereof into grooved runners for the two wheels on a side, with the central portion of said bar or plate formed into a coil spring, with hooks for attaching the front and rear ends of said bar to the wheels of the vehicle, and coil springs connecting the coil spring formed in said bar or plate to the opposite sides of the said wheels, substantially as and for the purposes described.

In testimony whereof I affix my signature in presence of two witnesses.

LOUIS LAVIGNE.

Witnesses:
JAMES H. MCGILLAN,
A. E. MERCHANT.